Dec. 3, 1940.  A. R. THOMAS  2,223,586
DEHUMIDIFYING SYSTEM
Filed June 26, 1937
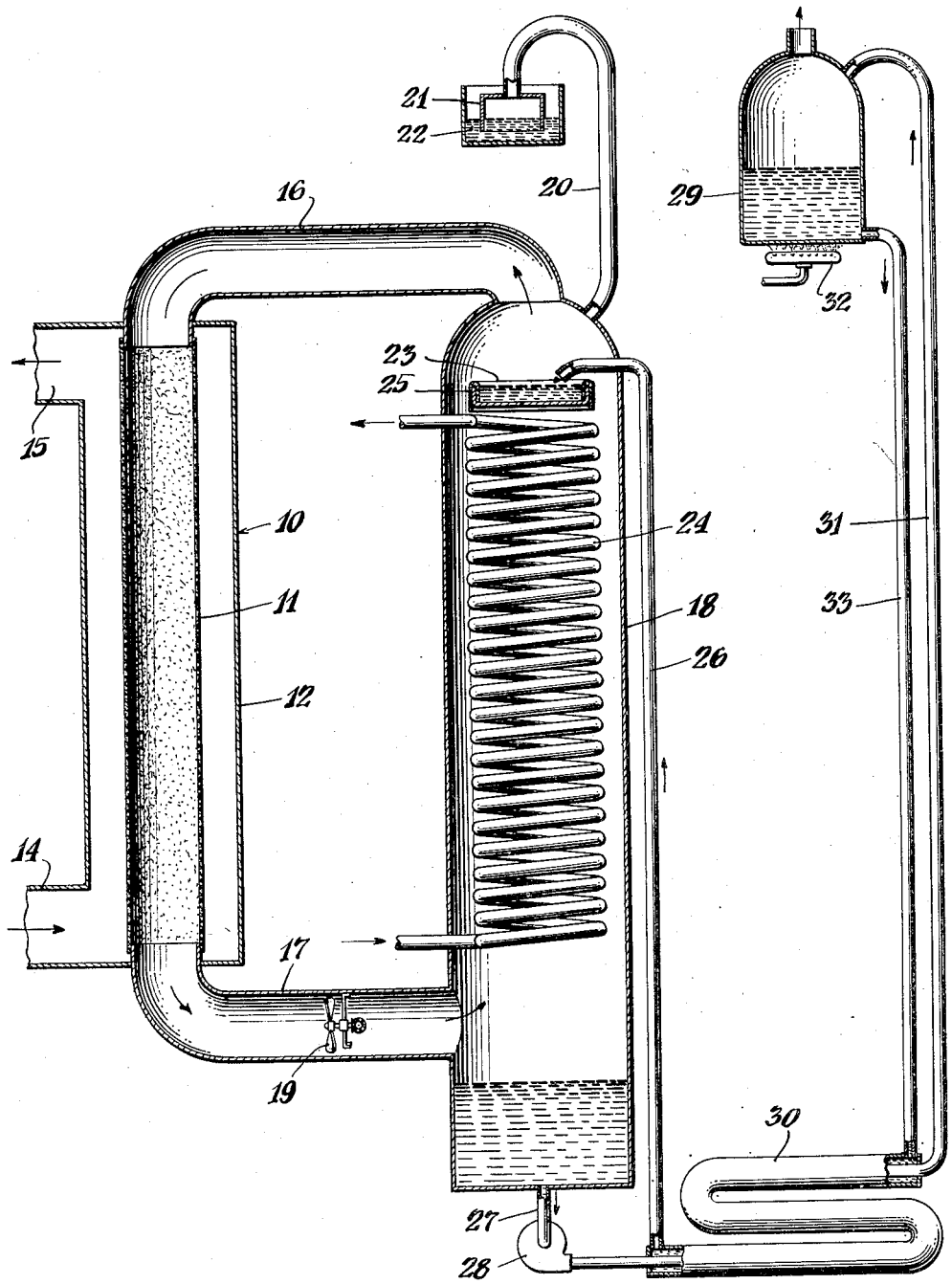
INVENTOR.
Albert R. Thomas
BY
E A Fenander his ATTORNEY.

Patented Dec. 3, 1940

2,223,586

UNITED STATES PATENT OFFICE 2,223,586

DEHUMIDIFYING SYSTEM

Albert R. Thomas, Evansville, Ind., assignor to Servel, Inc., New York, N. Y., a corporation of Delaware Application June 26, 1937, Serial No. 150,474

5 Claims. (Cl. 183—2)

My invention relates to dehumidification of gases, such as air, and has as an object the provision of an improved method and apparatus for dehumidifying gases without bringing a gas into direct contact with a dehumidifying agent.

In many instances good dehumidifying agents cannot be used to dehumidify gases by direct contact with a gas because of the objectionable results that are produced. One example of this is the use of sodium hydroxide solution for dehumidifying air. Although sodium hydroxide solution is one of a number of good dehumidifying agents in that it readily takes up water, it is not desirable to use it in direct contact with air because it also absorbs carbon dioxide from the air to form sodium carbonate which is precipitated and remains undissolved. I overcome the objection to the use of many dehumidifying agents by effecting removal of water vapor from a gas without bringing the gas into direct contact with the dehumidifying agent.

The invention, together with the objects and advantages thereof, will be better understood by reference to the following description and accompanying drawing forming a part of this specification, and of which the figure diagrammatically illustrates a dehumidifying system embodying the invention.

Referring to the drawing, the dehumidifying system embodying the invention comprises apparatus including a humidity exchanger 10. The humidity exchanger 10 includes a cylindrical member 11 which defines an inner chamber and an outer casing or jacket 12 which surrounds the inner member 11 and defines an outer chamber. The jacket 12 is provided with an inlet 14 and an outlet 15 which may be connected in a suitable conduit or duct system through which a gas to be dehumidified is circulated.

The cylindrical member 11 is formed of a suitable hygroscopic material, such as a parchment, for example, which is relatively permeable only to water vapor. The member 11 is connected by conduits 16 and 17 to a vessel 18 to form an inert gas circuit. A fan 19 driven in any suitable manner is provided in conduit 17 to circulate inert gas in the gas circuit. To the upper part of vessel 18 is connected a conduit 20 which in turn is connected to a trap 21. The trap 21 contains a body of liquid 22 which is open to the atmosphere.

Within vessel 18, which may be referred to as an absorber, are arranged a small vessel 23 and a coil 24 through which a suitable cooling medium, such as water, is circulated. An inverted U-shaped wick 25 is provided about the periphery of vessel 23 and the outer portion of the wick depends downward with the extreme end thereof located above the upper turn of coil 24.

A dehumidifying agent is introduced into the upper part of absorber 18 through a conduit 26 and is withdrawn from the absorber through a conduit 27. Conduits 26 and 27 form part of a liquid circuit for reactivating the dehumidifying agent withdrawn from absorber 18 and for returning such reactivated dehumidifying agent to the absorber. This reactivating circuit includes a pump 28 which is connected to conduit 27 and raises the dehumidifying agent to a boiler 29 through the inner passage of a liquid heat exchanger 30 and a conduit 31. The boiler 29 is open to the atmosphere and is adapted to be heated in any suitable manner, as by a gas burner 32. The dehumidifying agent is returned to the upper part of absorber 18 through conduit 33, the outer passage of the liquid heat exchanger 30 and conduit 26.

A good dehumidifying agent which has heretofore been undesirable for removing water vapor from air is sodium hydroxide solution because, as stated above, it also absorbs carbon dioxide when brought into direct contact with air. When sodium hydroxide solution is employed as a dehumidifying agent in the system just described, air from which carbon dioxide has been removed may be employed as the inert gas in the gas circuit.

When air containing water vapor enters the inlet 14 of jacket 12 the air flows upward on one side of the hygroscopic separating wall 11. Inert gas substantially free of water vapor enters the upper part of member 11 and flows downward therein in a direction opposite to that of the air in jacket 12.

Since the hygroscopic member 11 is permeable to water vapor and the partial pressure of water vapor in the inert gas is considerably lower than the partial pressure of water vapor in the air, water vapor in the air passes through the member 11 and into the inert gas. The air from which water vapor has been removed is discharged from jacket 12 at outlet 15, and the inert gas containing water vapor flows through conduit 17 into the lower part of absorber 18.

Sodium hydroxide solution introduced into absorber 18 through conduit 26 flows down over the surface of coil 24 and is cooled by the cooling medium flowing through the coil. The water vapor in the inert gas flowing upward in abosorber 18 is absorbed into the solution. The inert gas from which water vapor has been removed flows through conduit 16 to member 11 to complete the inert gas cycle, and the weakened solution collects in the bottom of absorber 18.

The weakened solution flows through conduit 27 to the pump 28, and is raised by the latter to boiler 29 through the inner passage of the liquid heat exchanger 30 and conduit 31. In boiler 29 water is expelled out of the sodium hydroxide solution, and the enriched or reactivated solution is returned to the upper part of absorber 18 through conduit 33, the outer passage of liquid heat exchanger 30, and conduit 26. By providing the liquid heat exchanger 30, heat transfer is effected between warm reactivated solution flowing toward absorber 18 and cooled weak solution flowing toward boiler 29.

In order to prevent any rupture of the hygroscopic separating wall 11, the inert gas circuit is preferably maintained at about atmospheric pressure and substantially the same as the pressure of the gas or air being dehumidified and flowing through jacket 12. Too great a difference in pressure on opposite sides of the separating wall is prevented by the liquid trap 21 which controls the leakage of inert gas to the atmosphere.

It will now be understood that in humidity exchanger 10 water vapor is transferred from a gas in the outer chamber to a fluid in the inner chamber by diffusion through the hygroscopic separating wall 11, due to the ability of the latter to absorb water vapor. In the particular embodiment shown and described only appreciable flow of water vapor will take place through the separating wall 11, whereby the paths of flow of gas in the outer chamber and inert gas in the inner chamber are separate and distinct. After the water vapor passes into the inert gas through the separating wall, the water vapor is effectively absorbed by the dehumidifying agent without coming in contact with the gas being dehumidified.

Although I have shown and described a particular embodiment of my invention, it will be apparent to those skilled in the art that modifications may be made without departing from the spirit and scope of the invention, as pointed out in the following claims.

What is claimed is:

1. In an air conditioning system, a dehumidifier including a wall of parchment which is hygroscopically permeable to water vapor and relatively impermeable to the other constituents of air, means for flowing air to be dehydrated in contact with one side of said wall, an absorber containing sodium hydroxide solution as absorbent for water vapor, and means for causing flow of inert gas first through said absorber and then in contact with the opposite side of said wall, whereby water vapor permeates said wall from the air to be conditioned into the relatively dry inert gas.

2. In an air conditioning system, a dehumidifier including a wall member which is hygroscopically permeable to water vapor and relatively impermeable to the other constituents of air, means for flowing air to be dehydrated in contact with one side of said wall, an absorber containing an absorbent for water vapor, and means for causing flow of inert gas first through said absorber and then in contact with the opposite side of said wall, whereby water vapor permeates said wall from the air to be conditioned into the relatively dry inert gas.

3. In an air conditioning system, a dehumidifier including a wall which is hygroscopically permeable to water vapor and relatively impermeable to the other constituents of air, means for flowing air to be dehydrated in contact with one side of said wall, and means for removing water vapor from the presence of the opposite side of said wall, whereby water vapor permeates said wall out of the air to be conditioned.

4. In an air conditioning system, a dehumidifier including a wall member which is hygroscopically permeable to water vapor and relatively impermeable to the other constituents of air, means for flowing air to be dehydrated in contact with one side of said wall, an absorber containing an alkaline absorbent for water vapor, and means for causing flow of inert gas first through said absorber and then in contact with the opposite side of said wall, whereby water vapor permeates said wall from the air to be conditioned into the relatively dry inert gas.

5. In an air conditioning system, a dehumidifier including a wall of parchment which is hygroscopically permeable to water vapor and relatively impermeable to the other constituents of air, means for flowing air to be dehydrated in contact with one side of said wall, and means for removing water vapor from the presence of the opposite side of said wall, whereby water vapor permeates said wall out of the air to be conditioned.

ALBERT R. THOMAS.